C. P. SNYDER.
TRANSMISSION GEARING.
APPLICATION FILED DEC. 19, 1914.
1,159,725.
Patented Nov. 9, 1915.
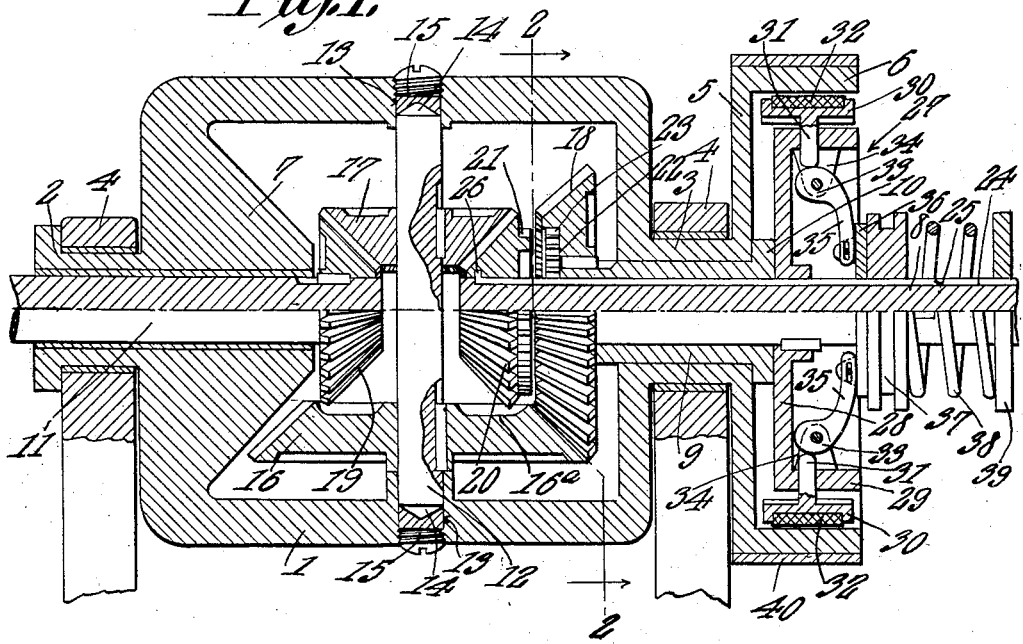
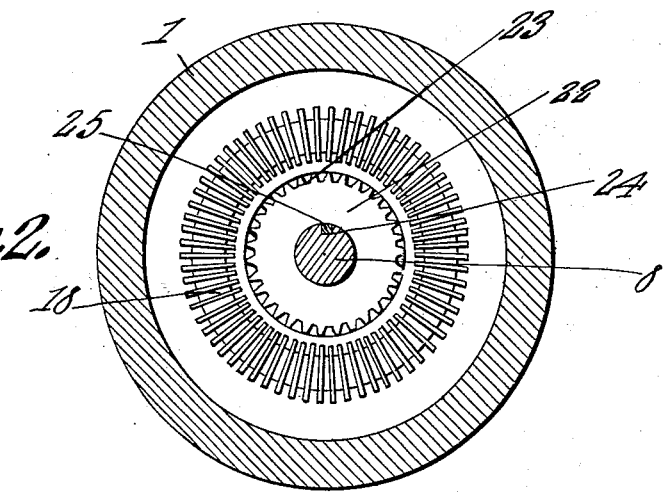
Witnesses
C. P. Snyder,
Inventor
Attorneys

UNITED STATES PATENT OFFICE.

CHARLES P. SNYDER, OF MOUNT CARMEL, PENNSYLVANIA.

TRANSMISSION-GEARING.

1,159,725.  Specification of Letters Patent.  Patented Nov. 9, 1915.

Application filed December 19, 1914. Serial No. 878,098.

*To all whom it may concern:*

Be it known that I, CHARLES P. SNYDER, a citizen of the United States, residing at Mount Carmel, in the county of Northumberland and State of Pennsylvania, have invented a new and useful Transmission-Gearing, of which the following is a specification.

The present invention appertains to transmission gearing, adapted particularly for use in motor vehicles, but capable for use for various other purposes, it being the object of the invention to provide a transmission gearing of novel and improved construction, whereby the driven shaft or element may be rotated in either direction at various speeds, or may be disconnected from the driving shaft or element so as to remain passive.

It is also within the scope of the invention, to provide a reversing and speed change transmission gearing, embodying a unique assemblage of the component parts, and improved generally in its construction and details to enhance the utility and efficiency thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in its preferred embodiment in the accompanying drawing, wherein:—

Figure 1 is a fragmental view of the transmission gearing, partly in elevation and partly in section. Fig. 2 is a cross sectional view taken on the line 2—2 of Fig. 1.

In carrying out the invention, the transmission gearing embodies a rotary gear case or drum 1, preferably of circular cross section, and having the reduced tubular hubs or trunnions 2 and 3 projecting centrally from its ends and journaled through suitable supporting bearings 4. The trunnion 3 is provided at that side of the corresponding bearing 4 opposite the case or housing 1 with a disk or wheel 5, having an upstanding rim 6, and the end of the case 1 having the hub 2 is provided with an inwardly projecting conical bearing portion 7. The portions 2, 3, 5, 6 and 7 are preferably cast integral with the case or drum 1 whereby the structure is substantial.

The driving shaft or element 8 which is connected to the internal combustion engine or other prime mover, is journaled through a sleeve 9 which is in turn journaled through the hub or trunnion 3 of the case 1, the outer end of the sleeve or bushing 9 having an annular flange 10 seating against the disk or plate 5 to limit the inward movement of the sleeve 9, with respect to the case 1.

The driven shaft or element 11 which is connected to the differential of a motor vehicle, or to the propelling wheels or their equivalent, is journaled through the hub 2 and bearing portion 7, the inner ends of the shafts 8 and 11 within the casing 1 being spaced apart, and the said shafts being in alinement.

Disposed within the case 1, is a diametrically or laterally arranged counter-shaft 12, which has its ends journaled within diametrically opposite apertures 13 provided in the periphery of the case 1, the ends of the shaft 12 being pointed or otherwise formed, as at 14 and being journaled and seated within the socket bearings 15 which are threaded or otherwise adjustably engaged within the apertures 13, so that the shaft 12 may be readily adjusted and held at its proper adjusted position for rotation about a transverse or diametrical axis with respect to the case 1. The counter-shaft 12 is disposed between the adjacent ends of the coaxial driving and driven shafts 8 and 11 respectively, and serves as a medium for operatively connecting the driving and driven shafts. To this end, a relatively large bevel gear 16 is keyed upon the counter-shaft 12 adjacent one end thereof, and a relatively small bevel gear 17 is also keyed upon the counter-shaft at the opposite side of the axis of the case 1, and near the center of the shaft 12 and the case, and intermeshes with a relatively small bevel gear 19 keyed upon the inner end of the shaft 11.

A relatively large bevel gear 18 is keyed upon the inner end of the sleeve or bushing 9, and intermeshes with the bevel gear 16 on the counter-shaft 12, and a relatively small bevel gear 20 which also serves in the office of a clutch, is slidable or feathered upon the inner end portion of the driving shaft 8, and is adapted to intermesh with the bevel gear 17 of the counter-shaft. The bevel gear 20 is provided upon its back, or that side adjacent the bevel gear 18, with an external gear or clutch portion 21, and the adjacent side or face of the gear 18 is provided with a recess or depression 22 for receiving the gear or clutch portion 21, and has its periphery formed with internal gear teeth or clutch portion 23 for interengaging with the teeth of the gear or clutch portion 21.

The gears 17 and 18 are spaced sufficiently apart, in order that the clutch gear 20 may be shifted into and out of engagement with the respective gears 17 and 18, and in order that the gear 20 may be moved to an intermediate neutral or idle position between the gears 17 and 18 so as to be disengaged from both of the last mentioned gears. When the gear 20 is moved toward the shaft 12, it will be brought into mesh with the gear 17, whereas if the gear 20 is moved away from the counter-shaft 12, it will be brought into engagement with the gear 18 through the medium of the gear or clutch portions 21 and 23.

As a means for shifting the clutch gear 20, the driving shaft 8 is provided with a longitudinal featherway 24, within which the longitudinally slidable shift rod 25 is disposed, and that end of the rod 25 within the case 1 is provided with an angularly extending portion 26 engaging into the gear 20, to thereby feather the gear 20 upon the inner end portion of the shaft 8 and cause the gear 20 to be slid longitudinally upon the shaft 8, when the shift rod 25 is moved in one direction or the other. The shift rod 25 may be operatively connected to a foot pedal (not shown), or other suitable actuating mechanism.

A clutch device 27 is provided between the driving shaft 8 and the disk or wheel 5 of the case 1 in order to cause the case 1 to rotate with the shaft 8 at the same or different velocity, and to enable the case 1 and shaft 8 to be disconnected. The clutch device 27 embodies a disk or plate 28 keyed upon the shaft 8 adjacent the disk or wheel 5 and bearing against the flange 10 of the sleeve or bushing 9, and the periphery of the disk 27 is provided with an outstanding rim 29 located adjacent and within the rim 6 of the disk 5. Clutch shoes 30 are disposed between the rims 6 and 29, and are provided with shanks or stem 31 slidable through the rim 29 of the disk 28 and the clutch shoes 30 are also provided with fiber or other friction members 32 coöperable and engageable with the interior of the rim 6 of the disk 5.

As a means for forcing or thrusting the clutch or friction shoes 30 into engagement with the rim of the disk 5, cams or eccentrics 33 are pivoted to inwardly projecting ears 34 carried by the rim 29 of the disk 28, and are provided with inwardly projecting lever arms 35 which are operatively connected to a washer or plate 36 slidable upon the shaft 8. A collar 37 is slidable upon the shaft 8 and bears against the washer 36, the collar 37 being provided with an annular groove for the engagement of a suitable actuating mechanism (not shown) whereby the collar 37 may be slid longitudinally away from the case 1, a coil wire expansion spring 38 being disposed around the shaft 8 between the collar 37 and a collar 39 secured upon the shaft 8. The spring 38 serves to move the collar 37 and washer 36 toward the case 1 whereby the arms 35 of the cams 33 are swung in the same direction, to cause the cams 33 to force the stems or shanks 31 of the shoes 30 outwardly, and to thereby cause the shoes 30 to frictionally engage the rim of the disk 5. When the collar 37 is retracted or drawn away from the case 1, the cams 33 may swing backwardly so that the clutch shoes 30 may be retracted out of engagement with the rim 6. It is to be noted that the disk 28 will rotate with the shaft 8, and will carry with it the clutch or friction shoes 30. A brake band or friction clutch 40 surrounds the rim 6 of the disk 5, and is connected to a foot pedal or other actuating means (not shown).

In operation, supposing the driving shaft 8 to be rotated by the engine, when the collar 37 of the clutch device is retracted to allow the shoes 30 to disengage the rim 6 of the disk 5, and when the brake band or clutch 40 is released, the case 1 may rotate freely relative to the shaft 8, and notwithstanding the fact that the clutch gear 20 may be engaged to either of the gears 17 and 18, the case 1 will rotate idly upon the driven shaft 11, and as a consequence the shaft 11 will remain passive. The mechanism may also be held in neutral or idle position, by sliding the clutch gear 20 to intermediate or neutral position between the gears 17 and 18, and even though either of the clutch devices 27 and 40 be thrown into engagement with the disk 5 of the case 1, the case 1 would merely rotate idly upon the shaft 11, since there would be nothing to cause the shaft 11 to rotate with the case 1 or shaft 8. In order to rotate the driven shaft 11 forward, or in the same direction as the driving shaft 8, the shift rod 25 is moved in the proper direction, to engage the clutch gear 20 with the gear 18, and the clutch device 27 is then gradually thrown into engagement with the rim 6 of the disk 5 (the clutch device 40 being released). Until the clutch device 27 is engaged to the rim 6, the case 1 is free to rotate since the gear 17 being rotated by the gear 20, may simply travel around the gear 19 without moving the shaft 11. However, as soon as the clutch or friction shoes 30 are brought into frictional engagement with the rim 6, the case will be gradually rotated with the shaft 8, and then as the friction shoes 30 engage the rim 6 with greater frictional effort, the case 1 will be brought to the same speed or rotation as the shaft 8. Thus, when the case 1 is made to rotate with the shaft 8, the shaft 11 will be rotated in the same direction as the shaft 8. When there is a slip between the friction shoes 30 and the rim 6, the shaft 11 will rotate slower than the shaft 8, and when there is no slip between the clutch device 27 and the rim 6, the shaft 11 will be rotated at the same speed as the shaft 8. Consequently, by controlling the clutch device 27, through the medium of the collar 37, the velocity of rotation of the shaft 11 relative to the shaft 8, may be controlled to a nicety. To reverse the mechanism, so that the shaft 11 will be rotated in a direction opposite to the direction in which the shaft 8 is rotated, the clutch gear 20 is shifted into engagement with the gear 17, so that when the clutch devices 27 and 40 are thrown out of engagement from the rim 6, the case 1 will be rotated in the same direction in which the shaft 8 is rotated, and consequently when the clutch device 40 is thrown into engagement with the rim 6, the speed of rotation of the case 1 will be reduced, and the shaft 11 will be gradually rotated, and its velocity of rotation will be increased as the clutch device 40 is thrown into greater frictional engagement with the rim 6.

Summing up the operation of the gearing in a more concrete manner, the device will be in neutral or idle position, when either the clutch devices 27 and 40 are thrown out of engagement from the rim 6 of the disk 5, or when the clutch gear 20 is moved to idle position between the gears 17 and 18. Thus, when the clutch devices 27 and 40 are released from the rim 6, even though the gear 20 be engaged to one or the other of the gears 17 and 18, the case 1 may rotate relative to the shaft 8, without interference, and the gears 16, 17, 18 and 20 may therefore rotate freely relative to one another, and the case 1 may rotate freely upon the shafts 8 and 11, without rotating the shaft 11. Should either of the clutch devices 27 and 40 be thrown into engagement with the rim 6, and the clutch gear 20 be slid to neutral position between the gears 17 and 18, the case 1 would be rotated with the shaft 8 or held stationary, but since the gears 17 and 16 which are operatively connected to the gear 19 of the shaft 11, are disconnected from the shaft 8, the shaft 11 will remain disconnected from the shaft 8, and will therefore remain passive. When the clutch gear 20 is shifted into engagement with the gear 17, with the clutch devices 27 and 40 in idle position, the gear 20 being rotated with the shaft 8, will rotate the gear 17 and counter-shaft 12, and the gear 17 working around the gear 19, will rotate the case 1 in the same direction as the shaft 8. Then, as the clutch device 40 is brought into gradual engagement with the rim 6, the rotation of the case 1 relative to the frame having the bearings 4, will be reduced, and as a consequence, the shaft 11 will be rotated in a direction opposite to the direction in which the shaft 8 rotates. When the clutch gear 20 is shifted into engagement with the gear 18, with the clutch devices 27 and 40 in idle position, the gear 18 is rotated with the shaft 8, and intermeshing with the gear 16 of the counter-shaft 12 opposite the gear 17 will rotate the counter-shaft 12 in one direction, and will consequently rotate the case 1 in the opposite direction to the shaft 8, so that when the clutch device 27 is thrown into engagement with the rim 6, the shaft 11 will be rotated in the same direction as the shaft 8. Thus, the gear 18 rotating the gear 16 of the counter-shaft 12, will rotate the gear 17 which is traveling around the gear 19 and, will rotate the case 1 in a direction opposite to the rotation of the shaft 8, and when the clutch device 27 is thrown into operation, the rotation of the case 1 will be retarded and the case will finally be rotated in the same direction as the shaft 8, and as a result the shaft 11 will be rotated due to te interengagement of the gears 17 and 19. The speed of the shaft 11 relative to the shaft 8, is governed by the clutch devices 27, which may be readily manipulated for this purpose. The gears 16 and 17 of the shaft 12 being located opposite one another, and being intermeshed with the gears 18 and 20 upon the shaft 8 at opposite sides of the gears 18 and 20, provides for the reversing of the mechanism, as above indicated. The case or drum 1 may be provided with a suitable hand hole for the insertion of the gears and other parts thereinto, to assemble the mechanism. That side of the gear 16 adjacent the gears 19 and 20 is provided with a recess or channel 16ª for accommodating the gears 19 and 20.

Having thus described the invention, what is claimed as new is:—

1. A transmission gearing embodying a driving element, a driven element, a rotary element intermediate the driving and driven elements, a transverse shaft journaled to the rotary element between the driving and driven elements, a bevel gear keyed upon the driven element, a pair of opposite bevel gears keyed upon the said shaft, one of the said pair of gears intermeshing with the first mentioned gear, a friction clutch coöperable with the rotary element for retarding the same, a friction clutch between the rotary and driving elements, and an operative connection between the driving element and said shaft, comprising a pair of bevel gears mounted upon the driving element and arranged to intermesh with the respective gears upon the shaft, and including controllable means for disconnecting one or the other of the gears carried by the shaft from the driving element.

2. A transmission gearing embodying a driving shaft, a driven shaft, a rotary element between the shafts, a transverse counter-shaft journaled to the rotary element, a bevel gear carried by the driven shaft, a pair of opposite bevel gears carried by the counter-shaft, one of the gears of the counter-shaft intermeshing with the first mentioned gear, a pair of bevel gears carried by the driving shaft and arranged to intermesh at opposite sides with the opposite gears of the counter-shaft, one of the gears carried by the driving shaft being mounted loosely thereon and the other one being mounted for longitudinal movement to move out of engagement with the respective gear of the counter-shaft and being rotated with the driving shaft, the gears carried by the driving shaft having interengageable portions, means for shifting the longitudinally movable gear, a friction clutch coöperable with the rotary element for retarding the velocity thereof, and a clutch device between the driving shaft and rotary element.

3. A transmission gearing embodying a pair of bearings, a rotary case having end hubs journaled in the bearings, driving and driven shafts journaled through the hubs, a transverse counter-shaft journaled within the case, a bevel gear carried by the driven shaft within the case, a pair of bevel gears carried by the counter-shaft, one of the gears of the counter-shaft intermeshing with the first mentioned gear, a friction clutch coöperable with the case for retarding the velocity thereof, a friction clutch between the case and driving shaft, and an operative connection between the counter and driving shafts comprising a pair of bevel gears mounted upon the driving shaft and being adapted to intermesh at opposite sides with the respective gears of the counter-shaft, and including means for disconnecting either one of the gears of the counter-shaft from the driving shaft.

4. A transmission gearing embodying a pair of bearings, a rotary case having end hubs journaled through the said bearings, a driven shaft journaled through one hub, a sleeve journaled within the other hub, a driving shaft journaled through the sleeve, a transverse counter-shaft journaled within the case, a bevel gear keyed upon the driven shaft, a pair of bevel gears keyed upon the counter-shaft and one of them intermeshing with the first mentioned gear, a bevel gear keyed upon the sleeve and intermeshing with one of the gears of the counter-shaft, a bevel gear carried by the driving shaft and adapted to intermesh with the other gear of the counter-shaft, means for disconnecting the last mentioned gear of the counter-shaft from the driving shaft and for connecting the gear carried by the sleeve with the driving shaft to rotate therewith, a friction clutch coöperable with the case for retarding the speed thereof, and a friction clutch between the case and driving shaft.

5. A transmission gear embodying a pair of bearings, a rotary case having end hubs journaled within the bearings, a driven shaft journaled through one hub, a sleeve journaled within the other hub, a driving shaft journaled through the sleeve, a transverse counter-shaft journaled within the case, a bevel gear keyed upon the driven shaft, a pair of bevel gears keyed upon the counter-shaft at opposite sides of the axis of the case, one of the gears of the counter-shaft intermeshing with the first mentioned gear, a bevel gear keyed upon the sleeve within the case, a bevel gear carried by the driving shaft within the case, the gears of the sleeve and the driving shaft being adapted to intermesh at opposite sides with the respective gears of the counter-shaft, the gear of the driving shaft being movable longitudinally thereon to disengage the respective gear of the counter-shaft, means for shifting the driving shaft gear, the gears of the driving shaft and sleeve having interengageable portions, whereby when the gear of the driving shaft is disengaged from the respective gear of the counter-shaft it may engage the gear of the sleeve, a friction clutch coöperable with the case for retarding the velocity thereof, and a friction clutch between the case and driving shaft.

In testimony that I claim the foregoing as my own, I have hereto affixed my signature in the presence of two witnesses.

CHARLES P. SNYDER.

Witnesses:
 IVY E. SIMPSON,
 MONROE E. MILLER.

Copies of this patent may be obtained for five cents each, by addressing the "Commissioner of Patents, Washington, D. C."